United States Patent
Zhu et al.

(10) Patent No.: US 7,851,083 B2
(45) Date of Patent: Dec. 14, 2010

(54) LITHIUM ION SECONDARY BATTERIES

(75) Inventors: Jianhua Zhu, Shenzhen (CN); Xi Shen, Shenzhen (CN); Qing Lai, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 1253 days.

(21) Appl. No.: 11/273,755

(22) Filed: Nov. 15, 2005

(65) Prior Publication Data

US 2006/0105236 A1 May 18, 2006

(30) Foreign Application Priority Data

Nov. 18, 2004 (CN) .................... 2004 2 0095558 U

(51) Int. Cl.
*H01M 2/02* (2006.01)
*H01M 2/04* (2006.01)
*H01M 2/06* (2006.01)
*H01M 2/08* (2006.01)

(52) U.S. Cl. .................... 429/177; 429/7; 429/176; 429/181; 429/185

(58) Field of Classification Search .......... 429/47–347, 429/7
See application file for complete search history.

(56) References Cited

U.S. PATENT DOCUMENTS

2004/0029000 A1 * 2/2004 Morita et al. ............... 429/162
2005/0271934 A1 * 12/2005 Kiger et al. ................. 429/159

FOREIGN PATENT DOCUMENTS

EP 1473785 A2 * 11/2004
JP 11176412 A * 7/1999

OTHER PUBLICATIONS

Machine translation of JP 11-176412 (Jul. 1999).*

* cited by examiner

*Primary Examiner*—Dah-Wei D Yuan
*Assistant Examiner*—Stephan Essex
(74) *Attorney, Agent, or Firm*—Venture Pacific Law, PC

(57) ABSTRACT

The present invention relates to lithium ion secondary batteries that have an enclosure with an electrode core compartment for holding the electrode core and a separate protection circuit compartment for holding the protection circuits, and terminal leads connecting the electrodes in the electrode core with the circuits in the protection circuit. The enclosure is made of non-conducting material such as plastic. The lithium batteries of this invention are light, not only because of the weight of the material of their enclosure, but also because its non-conducting character eliminates the necessity of additional protective features that are commonly necessary for enclosures with metal components.

17 Claims, 5 Drawing Sheets

LITHIUM ION SECONDARY BATTERIES

CROSS REFERENCE

This application claims priority from a Chinese patent application entitled "Lithium Ion Secondary Batteries" filed on Nov. 18, 2004, having a Chinese Application No. 200420095558.4. This application is incorporated herein by reference.

FIELD OF INVENTION

This invention relates to relates to lithium secondary batteries. Particularly, it relates to enclosures for lithium ion secondary batteries.

BACKGROUND

Since its successful development in 1990s, the lithium ion secondary battery has gradually been replacing traditional alkaline secondary batteries such as the nickel cadmium battery and the nickel hydrogen battery as it has a large specific energy, high working voltage, low self-discharging rate, long cycling life, and is non-polluting. It is widely used in modern mobile electronic and communications equipment, such as cell phones, notebook computers, portable computers, personal digital assistants (PDA), video cameras, digital cameras, portable DVD/VCD and MP3 players.

Currently, the commercial lithium ion battery pack is comprised of a metal shell and cover holding the electrode core and electrolyte, as well as other accessories such as the protection circuit and a plastic outer shell. There are several disadvantages to this type of battery pack.

First, the assembling of the metal shell and its contents is complicated. The formation of the metal shell requires multiple deep cuts as well as edge cutting, rinsing and heat drying. Stamped and partial injection is needed to form the cover. In addition, the assembling of the electrode pole and cover also requires multiple processes. The complexity of fabricating the metal shell and cover, together with the increased complexity of the assembly cause complications, lengthy production cycles, and high manufacturing costs.

Short-circuiting between the electrode core and the conducting metal shell and cover can easily occur, resulting in safety problems. To overcome this, several types of protection methods have to be adopted, again increasing the complexity of the battery and the cost of manufacturing.

Third, the metal shell and cover plate, together with their contents, and the supplementary protection installments all have to be placed inside a battery package. This significantly increases the weight and volume and decreases the gravimetric energy density and volumetric energy density of the battery. With the present day demand for high capacity, lightweight, and low cost batteries, an urgent solution to this problem is needed.

Fourth, there are numerous inter-welded spots inside this battery configuration. These welded spots occur at contact points such as those between the negative electrode tab and the connection plates; the connection plates and the cover board, and, the positive electrode and the cover. They can increase the internal resistance, heating, and the probability of the emergence of potential problems.

Due to the limitations of the prior art, it is therefore desirable to have novel lithium ion secondary batteries that are lightweight, have high energy densities, simple to manufacture, and low in costs.

SUMMARY OF INVENTION

An object or this invention is to provide lithium ion secondary batteries that are light with a high energy density.

Another object of this invention is to provide lithium ion secondary batteries with a simple structure and are easy and inexpensive to manufacture.

The present invention relates to lithium ion secondary batteries that have an enclosure with an electrode core compartment for holding the electrode core and a separate protection circuit compartment for holding the protection circuits, electrode core, electrolyte, and terminal leads connecting the electrodes in the electrode core with the circuits in the protection circuit. The enclosure is made of non-conducting material such as plastic. An advantage of this invention is that the lithium ion batteries that are embodiments of this invention have a simple structure, are easy and inexpensive to manufacture.

Another advantage of this invention is that lithium ion batteries that are embodiments of this invention are light and have a high energy density.

DESCRIPTION OF DRAWINGS

The foregoing and other objects, aspects and advantages of the invention will be better understood from the following detailed description of preferred embodiments of this invention when taken in conjunction with the accompanying drawings in which.

Figure 1:
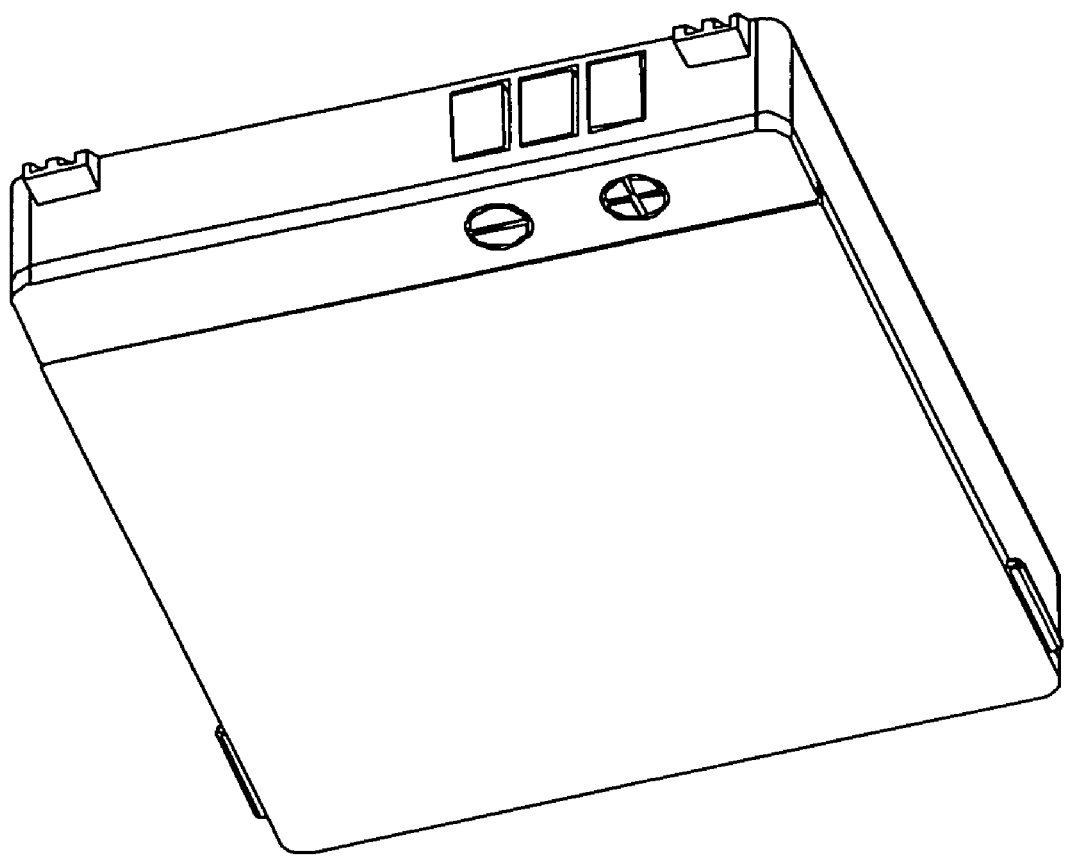
FIG. 1 is a view of a lithium ion secondary battery that is an embodiment of this invention.
Figure 2:
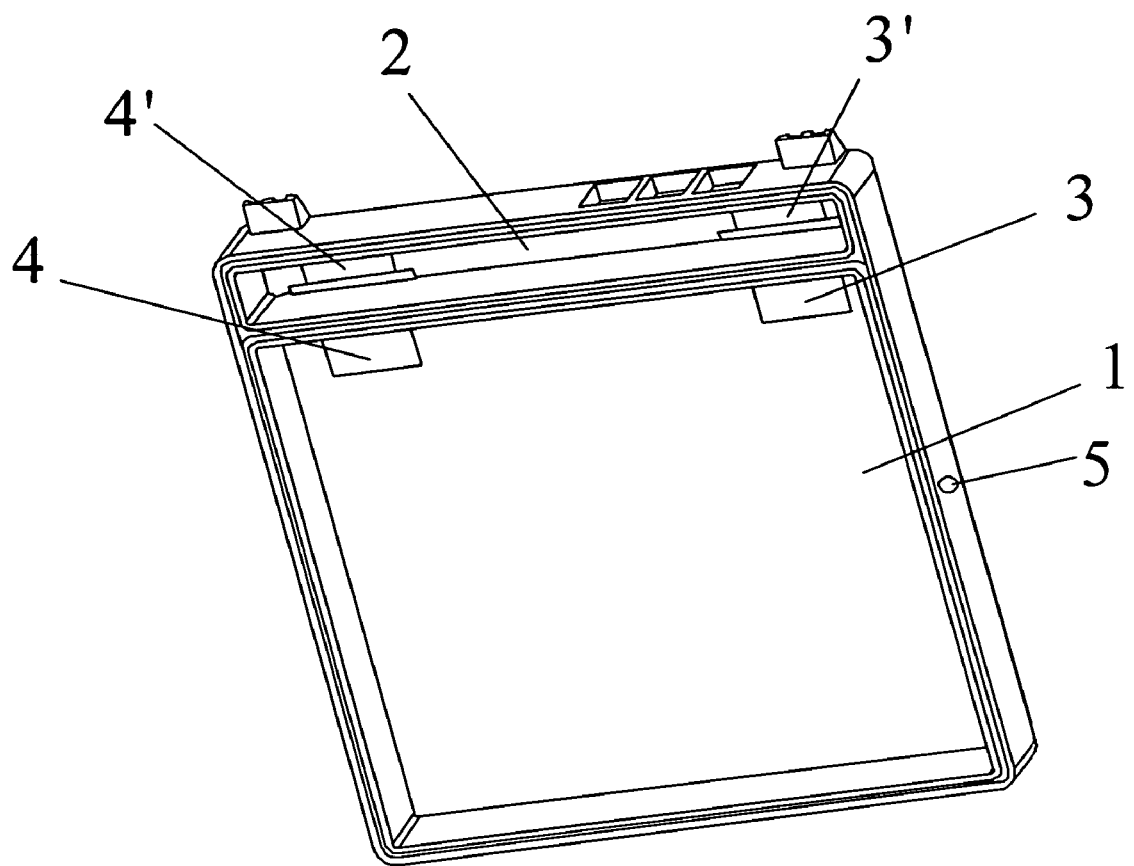
FIG. 2 is a structural view of an enclosure of a lithium ion secondary battery that is an embodiment of this invention.
Figure 3:
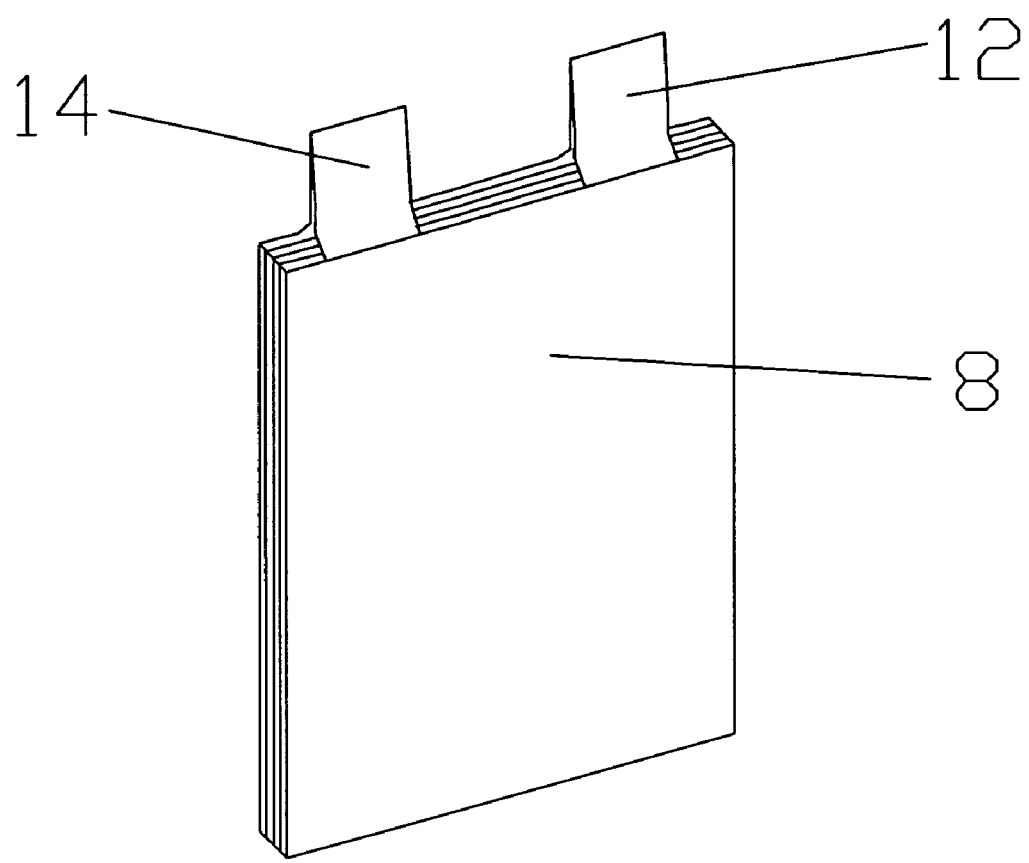
FIG. 3 is a structural view of an electrode core of a lithium ion secondary battery that is an embodiment of this invention.
Figure 4:
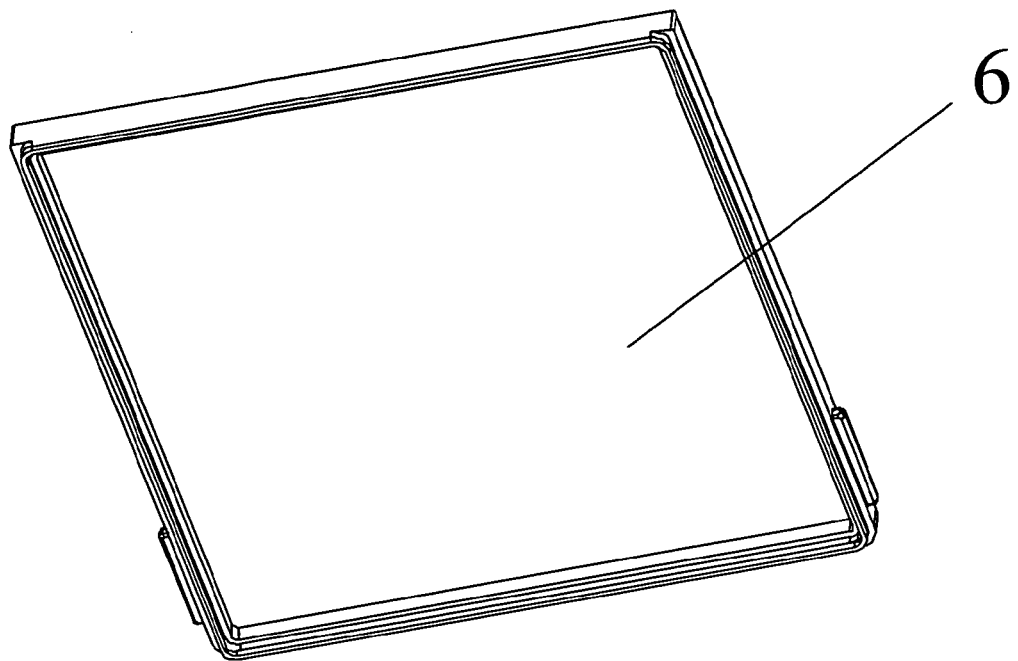
FIG. 4(a) is a structural view of a cover of a lithium ion secondary battery that is an embodiment of this invention.
FIG. 4(b) is structure view of another cover of a lithium ion secondary battery that is an embodiment of this invention.
Figure 4:
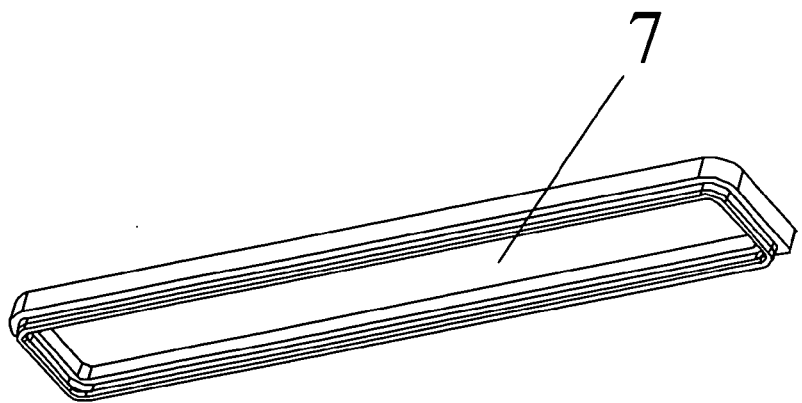
Figure 5:
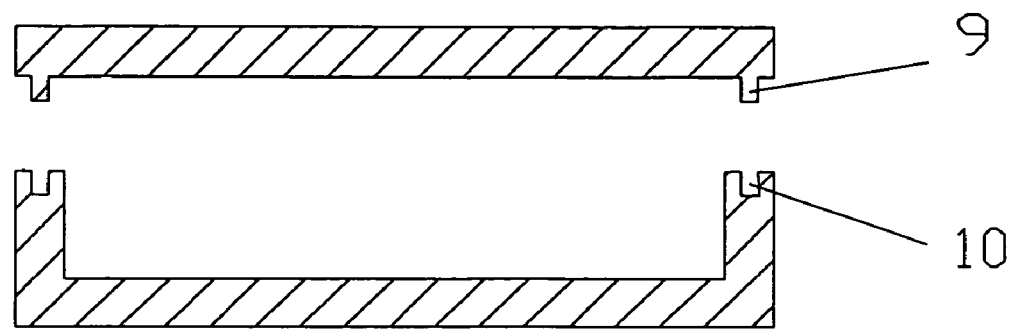
FIG. 5 is a diagram of a cross-section of an enclosure shell and cover of a lithium ion secondary battery that is an embodiment of this invention.

In the above-described figures, (1) is the electrode core compartment, (2) is the protection circuit compartment, (3), (3') and (4), (4') are the terminal leads for the positive and negative electrodes; (5) is the injection opening; (6) is the cover for said electrode core compartment, (7) is the cover for said protection circuit compartment; (8) is the electrode core; (9) is the protrusion of a cover; (10) is the corresponding groove for the protrusion (9), and (12) and (14) are the positive and negative electrode contact tabs respectively.

DETAILED DESCRIPTION OF INVENTION

The presently preferred embodiments of the lithium ion secondary batteries of this invention include an enclosure that has a compartment (first compartment or protection circuit core compartment) for holding the protection circuit, another separate compartment (second compartment or electrode core compartment) for holding the electrode core, and the electrolyte. The enclosure may have one or more enclosure covers. These covers encase the enclosure and the compartments and, preferably, seal the compartments.

In the preferred embodiments, the enclosure has two covers, one covers the electrode compartment (second cover) and another covers the protection circuit compartment (first cover). The materials for the enclosure (first non-conducting material), generally speaking the enclosure cover(s) (second non-conducting material), first cover (third non-conducting material), and second cover (fourth non-conducting material) can all be made of materials that are electrically non-conducting, such as plastic. The first, second, third and fourth conducting materials can be one or more materials selected from the following: polythene, polypropylene, polyetherimide, perfluoro alkoxy alkane, polyamide, and polycarbonate.

In the preferred embodiments, the enclosure cover and the enclosure are mated and sealed by a groove and protrusion method. That is, the enclosure has grooves or protrusions while the enclosure cover has corresponding protrusions or grooves such that when the enclosure is covered by the enclosure cover, the protrusion or protrusions are inserted into said groove or grooves. In embodiments where the electrode core compartment and protection circuit compartment have separate second and first covers, preferably, the second cover and the electrode core compartment are mated and sealed by a groove and protrusion method. Optimally, the first cover and the protection circuit compartment are also mated and sealed by a groove and protrusion method. In the preferred embodiments, the electrode core compartment with its cover is completely sealed. One method to achieve complete sealing is to use welding. The preferred welding methods include: ultrasonic welding and high frequency welding. The first compartment and its cover can be connected by many different means. Examples of the means for connections are: mechanical connection, welding, or gluing. The preferred methods are ultrasonic welding, high frequency welding, or using an adhesive.

Additional features such as safety features can easily be incorporated into the enclosure. For example, during the formation of the enclosure by a method such as injection molding, a pressure relief valve can be formed, either on the cover, or on one or more of the compartments.

In the embodiments, the protection circuits can include the protection circuit boards that are commonly used in lithium ion secondary batteries to prevent over-charging or over-discharging. It can also contain components to cut-off or switch the circuit to prevent overheating or high currents. The protection circuits are connected to the contact tabs for the positive and negative electrodes.

Many types of electrode cores can be used. One embodiment uses an electrode core fabricated by winding and stacking the positive electrode plate, separator membrane, and negative electrode plate in successive layers. In one embodiment, the positive electrode and negative electrode plates connect to the positive tab and negative tab that can generate inductive currents respectively. The electrode core is electrically connected to the protection circuit. The positive and negative electrode tabs of the electrode cores are then electrically connected to the positive and negative electrode plates of the protection circuit by the terminal leads for the positive and negative electrodes.

The points of contact of said terminal leads of the positive and negative electrodes with said second compartment is sealed by hot melting. In addition, it can also be covered with a sealing gel as long as said sealing gel can remain stable in the electrolyte used.

An injection hole (injection opening) for injecting the electrolyte can be located in the electrode core compartment or the cover for the compartment. The sealing for the injection hole can use the same sealing mechanism that is customarily used for metal enclosures. For example, an injection opening sealer can be used. This injection sealer can be a metal rivet, metal bead or a non-conducting rivet such as a plastic rivet. The material for said non-conducting rivet can be one or more of the following non-conducting material: polythene, polypropylene, polyetherimide, perfluoro alkoxy alkane, polyamide, and polycarbonate.

Embodiments of this invention with its non-conducting enclosure provide many advantages over the traditional enclosure that include both a metal shell and a plastic shell. It has a simple structure. This type of non-conducting enclosure replaces the metal shell and the supplementary features needed for the protection of electrode cores in traditional batteries. This significantly saves battery space and weight and increases the energy density of the batteries. In addition, the technology to fabricate the non-conducting enclosures of this invention is greatly simplified. Simple technology such as injection molding can be used to fabricate the non-conducting enclosure. In addition, with an enclosure that is non-conducting, processes needed for enclosures with metal components, such as canning, placing separation rings, and laser welding are no longer needed.

The use of non-conducting enclosure also improves the safety of the battery. Additional features, such as the pressure relief safety feature can be added anywhere on the enclosure easily with little or no increase in costs.

In addition, these embodiments also reduce the number of welding spots needed for the battery. This lowers the internal resistance and improves the high current discharge performance of the battery.

The following further describe the fabrication method and structure of a preferred embodiment of this invention that is illustrated in FIGS. 1 through 5.

In this embodiment, the lithium ion electrode core (8) is fabricated by a conventional method of stacking the positive electrode plate, the separation membrane, and the negative electrode plate in successive layers. The lithium ion electrode core is then placed into the electrode core compartment of the enclosure with terminal leads for the positive and negative electrodes. The positive and negative electrode tabs (12) and (14) of electrode core (8) are then connected by welding to the terminal leads (3), (4) for the positive and negative electrodes in electrode core compartment (1). The electrode core compartment is then covered with the plastic cover (6) for the electrode core compartment with its protrusion (9) inserted into its corresponding groove (10) on said electrode core compartment. The electrode core compartment with its cover is completely sealed by ultrasonic welding. Electrolyte is injected through the injection hole or opening (5). After injection, a plastic rivet is used to seal the injection hole (5) to complete the assembly of the electrode core compartment.

Using convention methods, the contact pieces for the positive and negative electrodes of the protection circuit is connected to the conductive ends of the terminal leads (3'), (4') of the positive and negative electrodes in the protection circuit compartment (2) by welding. The protection circuit compartment (2) is then covered and welded to its plastic cover (7) to complete the assembly of the protection circuit compartment. The assembled lithium ion secondary battery as shown in FIG. 1 is then ready for charging.

There are several preferred methods for securing the terminal leads to ensure that a seal is maintained between the compartments. In a pre-fabrication method, a terminal lead is fabricated by having its center portion sealed by a piece of non-conductive material. This pre-fabricated terminal lead is then placed in a pre-cut slot between the two compartments and fused into place. This method simplifies the sealing process such that the non-conductive center portion of the terminal lead can be of the same material as the compartments and it can be easily fused into place during the manufacturing process of the battery.

In yet another preferred method for securing the terminal leads is to directly precut slots between the compartments (the direct cut method). Sealant is first added to the slot, the terminal lead is inserted into the pre-cut slot, and sealant again is added to the slot. In this method, the location of the pre-cut slot may be selectively designed. In the preferred embodiment, as illustrated, the terminal lead is a flat strip and the flat strip is placed in a pre-cut slot flat between the compartments.

It shall be understood that the terminal lead used in the preferred embodiments can be a conductive strip, a wire strand, or a solid wire. In an alternate preferred embodiment, the terminal lead is a solid round wire stamped flat on both ends to provide contact surfaces. The round terminal lead can be put into place by either the pre-fabrication method or the direct cut method. One advantage of using a round solid wire is that it can maintain better seal in a vibration-prone environment.

In other embodiments, the terminal lead is not in a straight line connecting the two compartments. In one embodiment, it is placed in an "s" waveform manner. In yet another embodiment, it is placed in an "L" manner. In both cases, the seal can be better maintained than a straight line terminal lead placement.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

We claim:

1. A lithium ion secondary battery comprising:
   an enclosure having a first compartment and a second compartment, wherein said first compartment and said second compartment each have an opening and wherein said openings are on the same side of the enclosure;
   a first cover for sealing said first compartment;
   a second cover for sealing said second compartment;
   a protection circuit;
   an electrode core; and
   terminal leads wherein the positive and negative electrodes of said electrode core are connected to said protection circuit by said terminal leads;
   wherein said first cover and said second cover are separate pieces; wherein said enclosure is made of a first non-conducting material; said first compartment holds said protection circuit; and said second compartment holds said electrode core;
   wherein a seal is maintained between the first compartment and the second compartment; and wherein a seal is maintained between the first compartment and the second compartment by fusing a pre-fabricated terminal lead.

2. The lithium ion secondary battery of claim 1 wherein said first cover and said second cover are made of a second non-conducting material.

3. The lithium ion secondary battery of claim 1 wherein said first cover is made of a third non-conducting material; and said second cover is made of a fourth non-conducting material.

4. The lithium ion secondary battery of claim 1 wherein an electrode of said electrode core is electrically connected to said protection circuit.

5. The lithium ion secondary battery of claim 1 further comprising an injection opening sealer wherein
   said second compartment has an injection opening;
   said injection opening sealer seals said injection opening; and
   said injection opening sealer being either a rivet or a metal bead.

6. The lithium ion secondary battery of claim 3 further comprising of an injection opening sealer wherein
   said second cover having an injection opening;
   said injection opening sealer seals said injection opening; and
   said injection opening sealer being a rivet or a metal bead.

7. The lithium ion secondary battery of claim 2 wherein
   said first cover and said first compartment are mated and sealed using a groove and protrusion arrangement.

8. The lithium ion secondary battery of claim 3 wherein
   said second cover and said second compartment are mated and sealed using a groove and protrusion arrangement.

9. The lithium ion secondary battery of claim 1 wherein the terminal lead is a solid wire stamped flat on each end.

10. The lithium ion secondary battery of claim 1 wherein the terminal lead is placed in a waveform manner in connecting the first compartment and the second compartment.

11. The lithium ion secondary battery of claim 1 wherein the terminal lead is placed in a "L" manner in connecting the first compartment and the second compartment.

12. The lithium ion secondary battery of claim 3 wherein said first, third, and fourth non-conducting materials are each one or more non-conducting material selected from the group consisting of: polythene, polypropylene, polyetherimide, perfluoro alkoxy alkane, polyamide, and polycarbonate.

13. The lithium ion secondary battery of claim 5 wherein said rivet is a metal rivet or a non-conducting rivet and said non-conducting rivet is made of one or more non-conducting material selected from the group consisting of: polythene, polypropylene, polyetherimide, perfluoro alkoxy alkane, polyamide, and polycarbonate.

14. The lithium ion secondary battery of claim 12 further comprising an injection opening sealer wherein
   said second compartment or said second cover has an injection opening;
   said injection opening sealer seals said injection opening; and
   said injection opening sealer being a rivet or a metal bead.

15. The lithium ion secondary battery of claim 12 wherein said second cover and said second compartment are mated and sealed using a groove and protrusion arrangement.

16. The lithium ion secondary battery of claim 14 wherein said rivet is metal rivet or a non-conducting rivet and said non-conducting rivet is made of one or more non-conducting material selected from the group consisting of: polythene, polypropylene, polyetherimide, perfluoro alkoxy alkane, polyamide, and polycarbonate.

17. A lithium ion secondary battery comprising:
   an enclosure having a first compartment and a second compartment, wherein said first compartment and said second compartment each have an opening and wherein said openings are on the same side of the enclosure;
   a protection circuit;
   an electrode core;
   a first cover for sealing said first compartment;
   a second cover for sealing said second compartment;
   terminal leads; and
   an injection opening sealer;
   wherein
   said first cover and said second cover are separate pieces;

said first compartment holds said protection circuit;
said second compartment holds said electrode core;
the positive and negative electrodes of said electrode core are connected to said protection circuit by said terminal leads;
said enclosure is made of a first non-conducting material;
said first cover is made of a third non-conducting material;
said second cover is made of a fourth non-conducting material;
said second compartment or said second cover has an injection opening;
said injection opening sealer seals said injection opening, said injection opening sealer being a rivet or a metal bead;
said second cover and said second compartment is mated and sealed by a groove and protrusion method;
the terminal leads electrically connect said first compartment and said second compartment and a seal is maintained between the said first and second compartments by fusing a pre-fabricated terminal lead;
said first, third, and fourth non-conducting materials are one or more non-conducting material selected from the group consisting of: polythene, polypropylene, polyetherimide, perfluoro alkoxy alkane, polyamide, and polycarbonate; and
said rivet is a metal rivet or a non-conducting rivet and said non-conducting rivet is made of one or more non-conducting material selected from the group consisting of: polythene, polypropylene, polyetherimide, perfluoro alkoxy alkane, polyamide, and polycarbonate.

* * * * *